United States Patent [19]

Bond

[11] Patent Number: 4,525,603

[45] Date of Patent: Jun. 25, 1985

[54] RING AND LINE MONITOR FOR ANSWERING MACHINE

[75] Inventor: Raymond G. Bond, Long Beach, Calif.

[73] Assignee: T.A.D. Avanti, Inc., Compton, Calif.

[21] Appl. No.: 567,675

[22] Filed: Jan. 3, 1984

[51] Int. Cl.$^3$ .............................................. H04M 1/00
[52] U.S. Cl. .................................. 179/84 R; 179/6.16; 179/6.18
[58] Field of Search ............... 179/84 R, 84 SS, 84 C, 179/84 T, 6.03, 6.13, 6.15, 6.16, 6.18

[56] References Cited

U.S. PATENT DOCUMENTS 4,074,081  2/1978  Humm ............................... 179/84 R Primary Examiner—Gene Z. Rubinson
Assistant Examiner—James L. Dwyer
Attorney, Agent, or Firm—Keith D. Beecher

[57] ABSTRACT

A circuit and system is provided in a telephone answering system and which responds to direct current voltage differentials on the telephone line, independent of the actual direct current voltage level, to cause the telephone answering system to return immediately to its automatic answer position in the event the called party picks up his telephone, during the announcement interval (T1), or during the message recording interval (T2). This feature permits the telephone answering system immediately to return to its original condition in the presence of either of the two foregoing events, without wasting magnetic tape on blank messages, and without the calling party having to wait until the system goes through its entire (T1) and/or (T2) cycles in the event the called party picks up after the telephone answering instrument has answered a call. An additional circuit is provided with a manual switch to permit the called party to pick up when the switch is operated without interfering with the operation of the telephone answering system, and to listen to the message being recorded by the system.

2 Claims, 1 Drawing Figure

RING AND LINE MONITOR FOR ANSWERING MACHINE

BACKGROUND OF THE INVENTION

There are several requirements for telephone answering systems if the sytems are to operate properly and efficiently. A first requirement is that the system must distinguish between an incoming ring signal and outgoing dialing pulses from the telephone to which the system is connected. This discrimination must be such that the system will answer in the presence of an actual ring signal, but will not attempt to answer in the presence of outgoing dialing pulses.

Another requirement, if the telephone answering instrument is to operate efficiently, is that it should immediately stop operating and return to its original automatic answer positon should the calling party hang up before the end of the normal operational cycles of the instrument, or should the called party pick up before the end of the normal operational cycles, for the reasons set forth above.

The system of Copending application Ser. No. 517,005 filed July 25, 1983 in the name of Bradford E. Hanscom, and assigned to the present assignee, provides a simple and economical means which fulfills all the foregoing requirements. The system of the present invention includes an additional feature which permits the called party to pick up and listen in to the message being recorded by the telephone answering system if he so desires. This gives the called party the opportunity to monitor the call and then decide whether or not he wishes to answer.

DETAILED DESCRIPTION OF THE ILLUSTRATED EMBODIMENT

Figure 1:
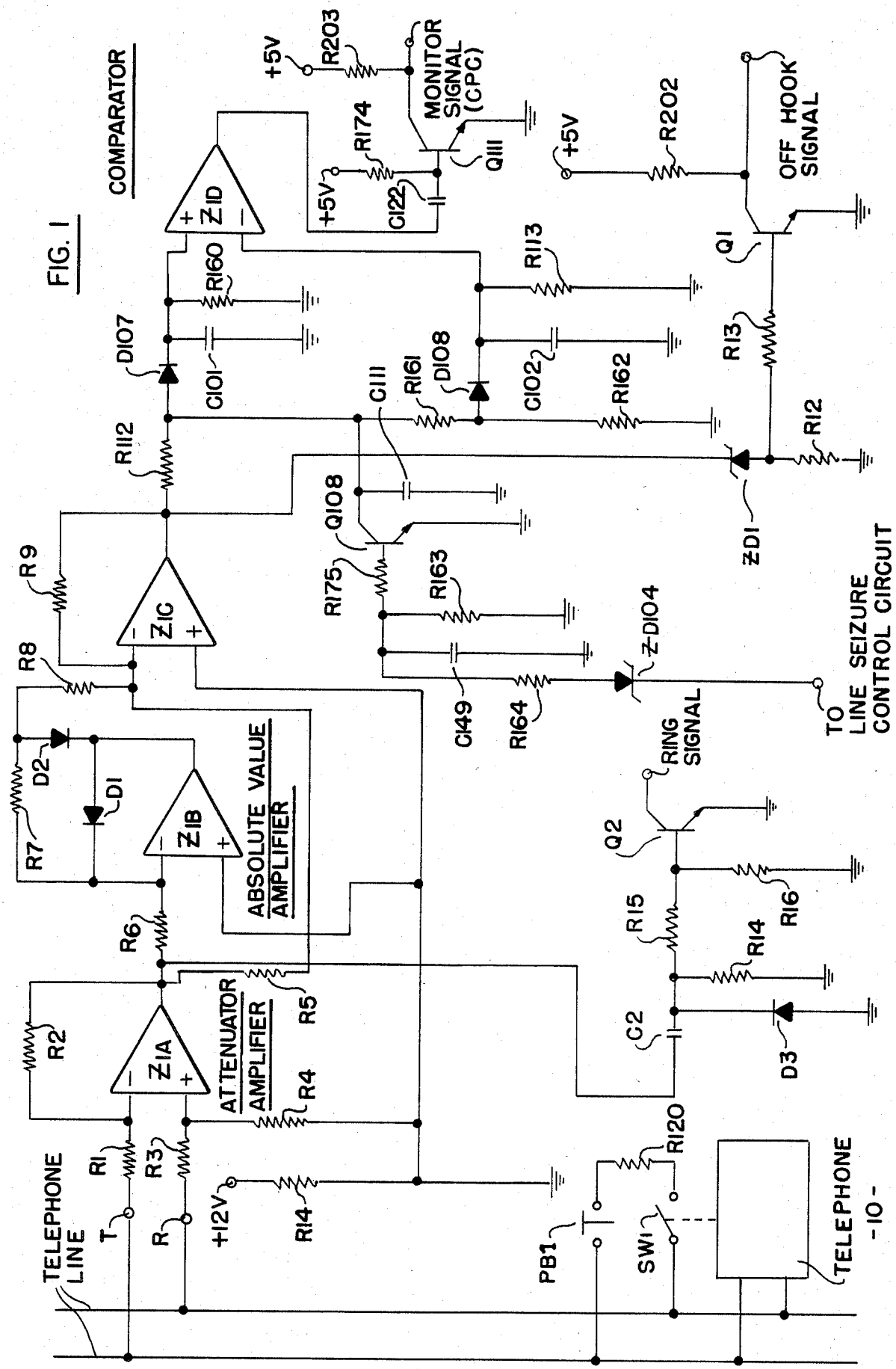
FIG. 1 is a schematic representation of one embodiment of the circuit and system of the invention.

The circuit illustrated in FIG. 1 includes a series of amplifiers Z1A, Z1B, Z1C and Z1D, which may all be contained in an integrated circuit of the type designated LM324. Amplifier Z1A is connected as an input attenuator amplifier with a gain of less than unity. For example, the gain of amplifier Z1A may be of the order of 0.025. Amplifiers Z1B and Z1C are connected as absolute value amplifiers, and may have a gain, for example, of the order of 8.2. Amplifier Z1D is connected as a comparator.

A pair of resistors R1 and R3, each of which may have a value of 22 megohms, are used to connect the inverting input terminal and non-inverting input terminal of amplifier Z1A to the telephone line. These resistors provide the high impedance coupling of the telephone answering instrument to the telephone line which is acceptable to the Federal Communications Commission in the United States, as well as to the British Post Office in the United Kingdom.

The output of amplifier Z1 is connected back to the input through a 560 kilo-ohm resistor R2, and the non-inverting input terminal is connected to a potential lead designated $V_{ref}$ through a 560 kilo-ohm resistor R4. Lead $V_{ref}$ is connected to the common junction of a pair of 1 kilo-ohm resistors R14 and R15 which are connected between the positive terminal of a 12 volt source and ground. Therefore, the lead $V_{ref}$ provides a reference voltage of 6 volts.

The amplifier Z1A is connected as an input attenuator amplifier with a gain, as stated, of 0.025. Therefore, variations in the voltage of the telephone line between, for example, ±40 volts causes the amplifier Z1A to provide an output of ±1 volt. This amplifier permits telephone line voltages up to 240 volts, for example, to be measured without distortion, and without damage to the system.

The output of amplifier Z1A is connected through a 10 kilo-ohm resistor R6 to the inverting input terminal of amplifier Z1B, and through a 10 kilo-ohm resistor R5 to the inverting input terminal of amplifier Z1C. The non-inverting input terminals of amplifiers Z1B and Z1C are connected to the voltage reference lead $V_{ref}$.

The output of amplifier Z1B is connected to a pair of diodes D1 and D2 which, together with a 10 kilo-ohmn resistor R7 are connected to the inverting input terminal of amplifier Z1B, and through a 5.1 kilo-ohm resistor R8 to the inverting input terminal of amplifier Z1C. The output of amplifier Z1C is connected back to the non-inverting input terminal through a 82 kilo-ohm resistor R9.

The amplifiers Z1B and Z1C are connected as a full-wave rectifier circuit, and function as absolute value amplifiers with a gain, for example, of 8.2. These amplifiers provide independence to the polarity of the voltage appearing on the telephone line, so that, for example, an output of ±1 volt from the amplifier Z1A would cause the amplifier circuits Z1B, Z1C to produce an output of 8.2 volts.

The output of the attenuator amplifier Z1A is also coupled through a 0.1 microfarad capacitor C2 to the base of an NPN transistor Q2 whose emitter is connected to ground. The capacitor is connected to the base through a 22 kilo-ohm resistor R15, which, in turn, is connected to a 10 kilo-ohm grounded resistor R14, and to a 47 kilo-ohm grounded resistor R16. The junction of capacitor C2 and resistor R15 is also connected to a grounded diode D3.

The circuit of transistor Q2 responds to the A.C. output of amplifier Z1A to provide a ring signal for the telephone answering instrument.

The output of amplifier Z1C is connected through a Zener diode ZD1 to a grounded 4.7 kilo-ohm resistor R12. The junction of the Zener diode and resistor R12 is connected through a 4.7 kilo-ohm resistor R13 to the base of a grounded emitter NPN transistor Q1. The collector of transistor Q1 is connected to the positive terminal of the 5 volt source through a 3 kilo-ohm resistor R202. The transistor Q1 is normally conductive. However, if the voltage of the telephone line drops, for example, to less than 20 volts, the transistor Q1 becomes non-conductive, and its output voltage rises abruptly.

The line voltage of the telephone line is normally above 20 volts, for example, in the neighborhood of 50 volts, for most telephone systems. Therefore, under normal conditions, transistor Q1 is conductive. Then, should a ring signal occur, the ring signal is detected by the circuit of transistor Q2, and the ring signal from the transistor Q2 is used to activate the telephone answering system.

However, should a local telephone 10 be in an off-hook condition, the telephone line voltage accordingly would drop to less than 20 volts, causing transistor Q1 to be non-conductive. This is because switch SW1 closes when the local telephone goes off-hook placing a 300 ohm resistor R120 across the line, so long as pushbutton switch PB1 is closed. Under such conditions, any signals on the telephone line could be dialing pulses from the local telephone, and, in any event, the telephone answering instrument should not answer, because the local telephone is off-hook. An appropriate circuit in the telephone answering system looks at the output voltage from transistor Q1 directly after the occurrence of what appears to be a ring signal on the line. This circuit permits the ring signal ouput from transistor Q2 to activate the telephone answering system, only if the voltage output from transistor Q1 is at the low value, and it prevents the telephone answering instrument from answering if the voltage output from transistor Q1 is at a high level.

Accordingly, the telephone answering instrument will answer only in the presence of a true ring signal, and it will be unresponsive to outgoing dialing pulses, which occur when the local telephone is in an off-hook condition.

As described in the copending application, the output of operational amplifier Z1C is connected to the non-inverting input of operational amplifier Z1D through a 2.2 kilo-ohm resistor R112 and through a diode D107. The non-inverting input is connected to a grounded capacitor C101 of 10 microfarads, and a grounded resistor R160 of 1.2 megohms.

An NPN transistor Q108 has its collector connected to diode D107 and to a grounded 10 microfarad capacitor C111. The collector is also connected through a 2.2 kilo-ohm resistor R161 to a grounded 100 kilo-ohm resistor R162 and through a diode D108 to the inverting input of operational amplifier Z112. The inverting input is connected to a grounded 10 microfarad capacitor C102 and to a grounded 2.2 megohm resistor R113.

The output of amplifier Z1D is connected through a 1 microfarad capacitor C122 to the base of an NPN transistor Q111. The base of transistor Q111 is also connected through a 10 kil-ohm resistor R174 to the positive terminal of the 5 volt source. The emitter of transistor Q111 is grounded, and its collector is connected through a 3 kilo ohm resistor R203 to the positive 5 volt terminal. The monitor signal appears at the output terminal connected to the collector of transistor Q111.

A Zener diode ZD104 has its cathode connected to the line seizure control circuit of the telephone answering system, and its anode is connected through a 10 kilo-ohm resistor R164 and through a 16 kilo-ohm resistor R175 to the base of transistor Q108. The junction of resistors R164 and R175 is connected to a grounded 100 microfarad capacitor C104 and to a grounded 16 kilo-ohm resistor R163.

The cathode of Zener diode ZD104 is connected to the line seizure control circuit of the telephone answering system. Prior to line seizure the cathode of Zener diode ZD104 is established at a positive voltage by the line seizure control circuit, and the cathode is established at a near ground potential by the control circuit after a line seizure has been made. This means that so long as the telephone answering system has not responded to a telephone ring signal, transistor Q108 is conductive, establishing the junction of resistors R111 and R161 at ground potential, thereby decoupling the output of amplifier Z1C from the input circuitry of amplifier Z1D. The capacitors C101, C102 are now in a discharged state.

Under such conditions, the off-hook signal circuit of transistor Q1 is still effective, and controls the system so that it will not respond to spurious ring signals, in the manner described above. When a genuine ring signal occurs, the telephone answering system answers and its line seizure control circuit connects the system to the telephone line, establishes the cathode of Zener diode ZD104 at a near ground potential. Transistor Q108 will now be made non-conductive after the time delay caused by the discharge of capacitor C149 through resistor R163. The output of amplifier Z1C is now coupled to the input circuit of comparator Z1D, and that output, as described above, establishes a particular direct current voltage level corresponding to a telephone line voltage of the order of 10 volts.

The capacitors C101 and C102 now charge up, with capacitor C102 being charged to approximately 96% of the voltage level of capacitor C101, so that the output of comparator Z1D remains high so long as the calling party does not hang up, or so long as the called party does not pick up. Should either of these two events happen, the resulting drop in voltage in the output from amplifier Z1C causes diodes D107 and D108 to become non-conductive, and the capacitor C101 discharges through resistor R160, and capacitor C102 discharges through resistor R113. If the drop in voltage in the output of amplifier Z1C continues for at least 600 milliseconds, capacitor C101 will discharge to a point lower than capacitor C102. These voltages across capacitors C101 and C102 are compared at the inputs of comparator Z1D, and when they reach a particular differential, the comparator produces a voltage drop at its output. This voltage drop is differentiated by capacitor C122 and resistor R174, causing transistor Q111 to become non-conductive. When transistor Q111 becomes non-conductive, the control circuitry of the telephone answering system will cause the system to reset and disconnect the system from the telephone line.

It is necessary to decouple the circuit of capacitors C101, C102 from the output of amplifier Z1C until the answering system has actually answered a call and has seized the telephone line, otherwise the drop in voltage in the telephone line when line seizure occurred would be interpreted as a calling party hang-up, or a called party pick-up, causing the system to hang up.

Accordingly, when the telephone answering system answers a call, the direct current voltage on the telephone line drops, e.g., from 50 volts to approximately 10 volts. This drop is attenuated by amplifier Z1A. The approximate output of Z1A can be either plus or minus 0.25 volts from the reference which, for example, may be 6 volts.

If the output of Z1A is greater than 6 volts,, the voltage is amplified by the operational amplifier Z1B and will be output to operational amplifier Z1C as a less positive voltage in diode D2 and resistor R8. This will cause Z1C to output a positive voltage of approximately 8 volts for the off-hook condition.

If the output voltage of Z1A is less than 6 volts, it is fed to Z1C through resistor R5 which, likewise, will cause the output Z1C to reach ±8 volts for the off-hook condition.

The ±8 volts outputed by Z1C Because of the off-hook condition is fed to capacitor C101 through resistor R112 and diode D107, and is fed to the capacitor C102 through resistors R112, R161 and diode D108. This voltage output will not be passed through Zener diode ZD1, thus rendering Q1 non-conductive indicating the "off-hook" condition. Capacitor C102 now charges to approximately 96% of the voltage across capacitor C101. Since the plus input of the comparator Z1D is more positive than the minus input, the output of Z1D will be approximately ±12 volts.

Now should the telephone 10 connected to the same line be taken off hook, and pushbutton switch PB1 is closed, a voltage drop occurs on the telephone line. This drop affects Z1C by driving its output less positive. If the drop is of at least 600 milli-seconds in duration, C101 will discharge to a point lower than C102. The voltage across the capacitors are compared by Z1D and will cause a voltage drop at its output.

This voltage drop is differentiated by C122 and R174 causing Q111 to become non-conductive. When Q111 becomes non-conductive the system is caused to be disconnected from the telephone line and to be reset.

As mentioned above, the input circuit of Z1D becomes effective only after the telephone answering system has seized the telephone line, so that it responds to drops in voltage on the telephone line resulting from called party pick-up, so as to avoid Z1D responding to any other condition which could produce voltage drops in the telephone line. However, if the called party merely wishes to listen in, he does not close switch PB1 and the telephone answering system continues to operate.

The invention provides, therefore, an improved and simplified circuit and system which is effective to detect a called party pick-up condition if desired, or to be independent of called party pick-up if the called party wishes merely to listen in.

It will be appreciated that while a particular embodiment of the system of the invention has been shown and described, modifications may be made. It is intended in the following claims to cover all modifications which appear within the true spirit and scope of the invention.

What is claimed is:

1. In combination: a telephone answering system adapted to be connected to telephone line and which includes control circuitry for deactivating the telephone answering system when a change in line voltage on the telephone line exceeds a predetermined differential; and a telephone adapted to be connected to the telephone line and including resistance means and a switch series connected across the telephone line, said switch being closed when the telephone is picked up to place said resistance means across the telephone line thereby causing a change in the line voltage of the telephone line in excess of said predetermined differential when the telephone line is picked up, and a further switch connected in series with said first-named switch and said resistance means for preventing said change in line voltage when the telephone is picked up and said further switch is open.

2. The combination defined in claim 1, in which said further switch is manually operated.

* * * * *